United States Patent [19]
Bogdanovich

[11] 3,856,331
[45] Dec. 24, 1974

[54] HITCH

[76] Inventor: Nick Bogdanovich, 5051 12th Ave., Hanford, Calif. 93230

[22] Filed: Oct. 31, 1973

[21] Appl. No.: 411,257

[52] U.S. Cl............ 280/479 R, 280/461 A, 280/515
[51] Int. Cl............................................. B60d 1/04
[58] Field of Search............ 280/479 R, 479 A, 509, 280/515; 172/275

[56] References Cited
UNITED STATES PATENTS

| | | | |
|---|---|---|---|
| 773,537 | 11/1904 | Boese | 280/515 |
| 2,547,772 | 4/1951 | Peters | 280/509 |
| 2,783,059 | 2/1957 | Hartl | 280/509 |
| 3,266,817 | 8/1966 | Engstrom | 280/509 X |
| 3,347,564 | 10/1967 | Snoozy | 280/479 R |
| 3,421,779 | 1/1969 | Shelby | 280/479 R |
| 3,542,399 | 11/1970 | Myers | 280/479 A |

Primary Examiner—Leo Friaglia
Attorney, Agent, or Firm—Huebner & Worrel

[57] ABSTRACT

An improved hitch adapted to be supported by a three-point hitch assembly. The hitch is characterized by a hitch-pin receiver including a rearwardly directed throat for receiving therein a vertically oriented hitch pin, and a spring-biased latching pawl having a peripheral fluke and an impact surface, said fluke being positioned adjacent to the throat and said impact surface being disposed transversely thereof when the pawl is in a first position, and said fluke being extended transversely of the throat when the pawl is moved in a second position in response to an engagement of a hitch-pin with the impact surface, and a spring-biased locking pin engageable with the pawl for securing the pawl in the second position, and a manually operable linkage for releasing the locking pin.

1 Claim, 9 Drawing Figures

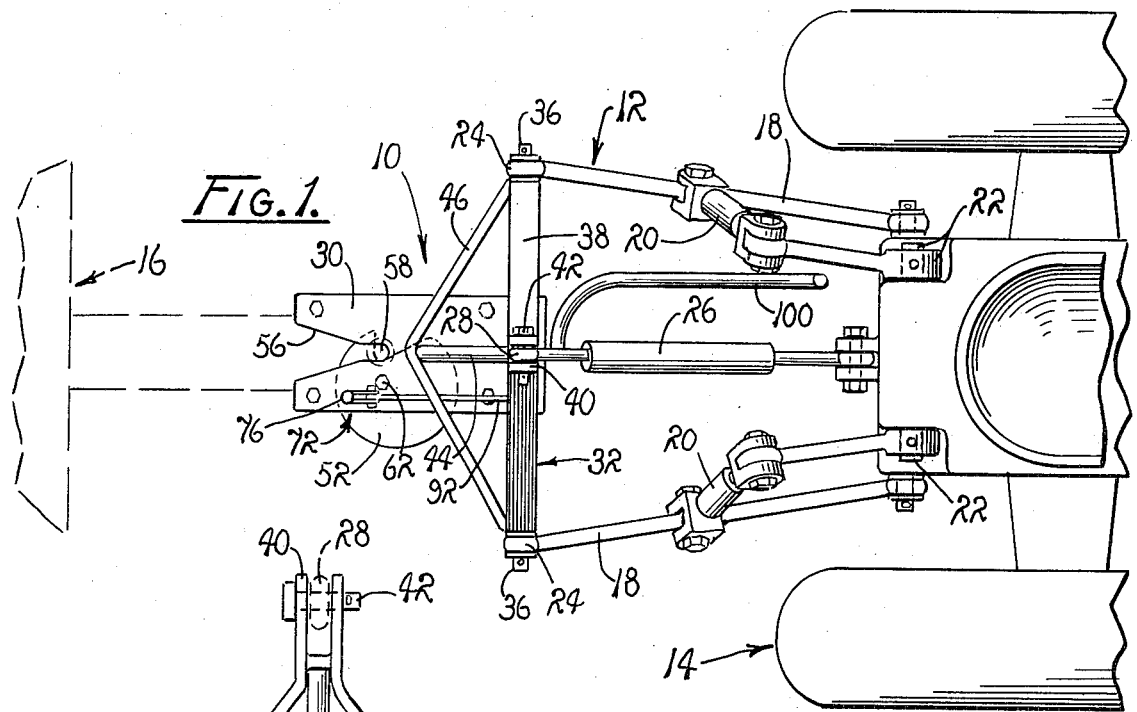
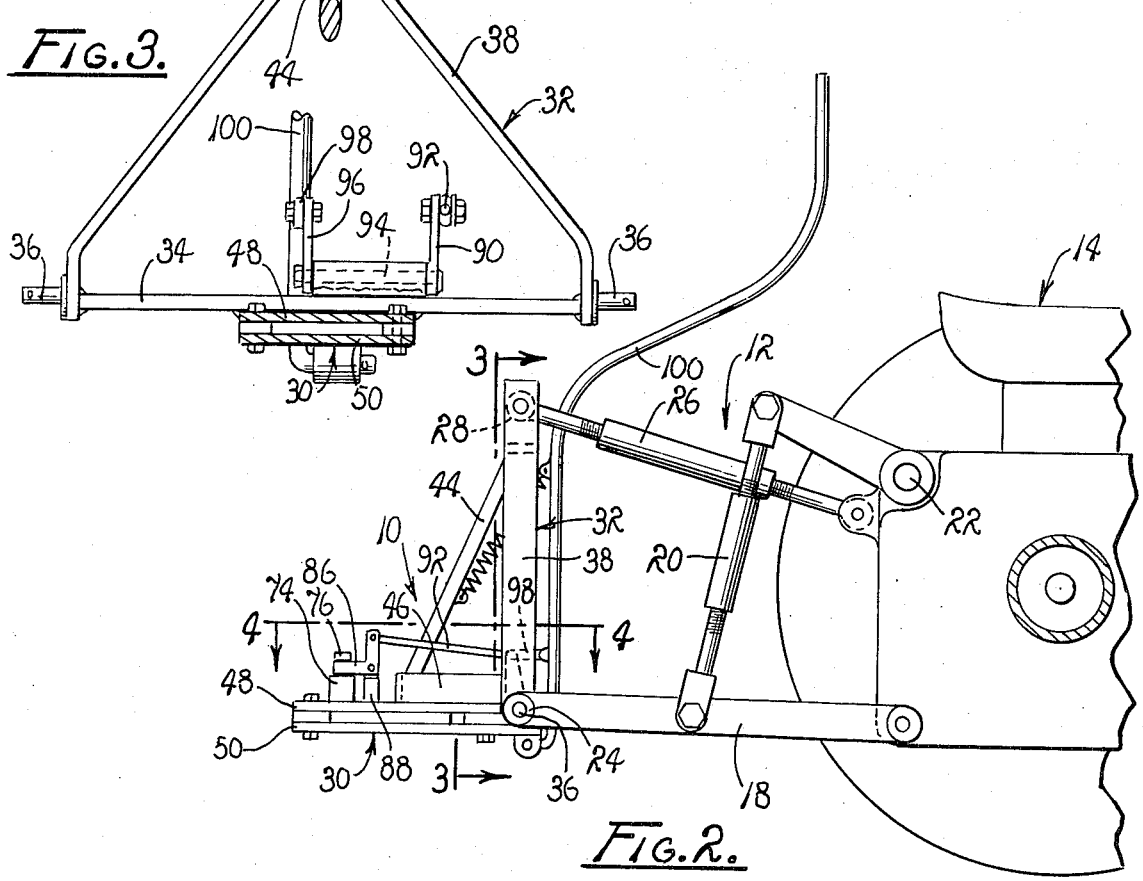

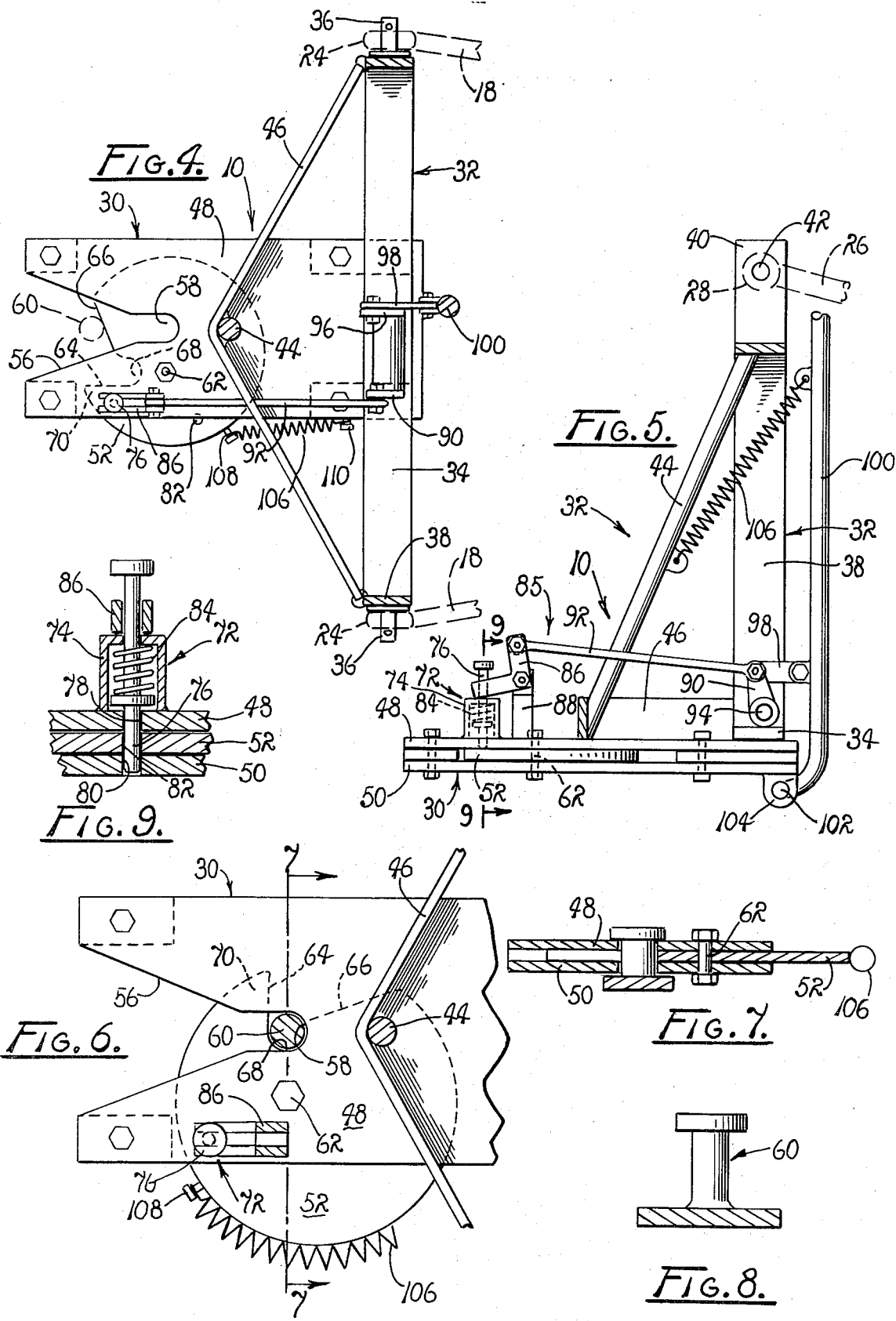

HITCH

BACKGROUND OF THE INVENTION

The invention relates to a hitch for towing a vehicle and more particularly to an improved hitch adapted to be supported by a three-point hitch mechanism mounted at the rear of a tractor.

Hitching devices employed for coupling towable vehicles with towing vehicles are notoriously old and are adapted to function in various modes.

Vehicles, such as wheeled tractors, employed in towing towable trailers, gondolas and similar implements and vehicles found in the field of agriculture, normally are provided with drawbars to which the tongue of a towable vehicle or implement is attached. Frequently, a clevis adapted to receive the distal end of the tongue of the vehicle to be towed is employed. In other instances, the distal end of the tongue is provided with a clevis particularly suited to receive a drawbar mounted at the rear of towing vehicles.

While a hitch assembly which includes both a drawbar and a clevis often is considered to be suitable for its intended purpose, it should be appreciated that in certain instances use of such a hitch simply does not prove to be satisfactory, particularly where the tongue of the vehicle to be towed is quite heavy so that manipulation to an extent required in effecting a coupling thereof with a drawbar is impractical, if not physically impossible. Since vehicles such as gondolas and the like are, in practice, coupled with a tractor repeatedly for repositioning purposes, the task of coupling and uncoupling these vehicles with the tractors employed becomes an onerous one.

Therefore, it is the general purpose of the instant invention to provide an improved hitch particularly suited to be coupled in combination with a three-point hitch assembly provided for facilitating a rapid coupling of towable vehicles, such as trailers and gondolas, with towing vehicles, such as tractors and the like.

OBJECTS AND SUMMARY OF THE INVENTION

It is therefore an object of the instant invention to provide an improved hitch.

It is another object to provide an improved hitch adapted to be mounted at the rear of a towing vehicle for facilitating a rapid coupling of a towable vehicle therewith.

Another object is to provide an improved hitch for coupling the tongue of a vehicle such as a gondola with a tractor equipped with the three-point hitch assembly.

It is another object to provide in combination with a three-point hitch for a tractor, an improved hitch adapted to receive a hitch pin projected from the distal end of a tongue and responsively effect a coupling of the hitch pin with the three-point hitch assembly.

It is another object to provide an improved hitch having a hitch-pin receiver including a rearwardly directed throat for receiving therein a vertically oriented hitch pin, and a latching pawl supported for oscillatory motion responsively imparted thereto as an engagement of a hitch pin is effected for releasably securing the hitch pin against withdrawal.

These and other objects and advantages are achieved through the use of a hitch provided with a hitch-pin receiver including a rearwardly directed throat for receiving a vertically oriented hitch pin affixed to the tongue of a trailer, gondola or the like, and a latching pawl having a fluke supported for oscillatory motion relative to the throat, said pawl being displaceable from a first position, wherein the fluke is in juxtaposition with the throat and a second position wherein the fluke is extended across the throat, in response to an engagement of the pawl with the hitch pin, for capturing the hitch pin and thus securing it from withdrawal from the throat, as will become more readily apparent by reference to the following description and claims in light of the accompanying drawings.

BRIEF DESCRIPTION OF THE DRAWINGS

FIG. 1 is a fragmented, top plan view of a tractor having extended rearwardly therefrom a three-point hitch supporting an improved hitch having a throat for receiving a hitch pin and a pawl for capturing the hitch pin.

FIG. 2 is a fragmented, side elevation of the hitch illustrated in FIG. 1.

FIG. 3 is a sectional view, taken generally along line 3—3 of FIG. 2.

FIG. 4 is a partially sectioned top plan view, taken generally along line 4—4 of FIG. 2.

FIG. 5 is a partially sectioned side elevation, on an enlarged scale, of the hitch.

FIG. 6 is a fragmented, top plan view of the hitch.

FIG. 7 is a sectional view, taken generally along line 7—7 of FIG. 6.

FIG. 8 is an elevational view of a hitch pin.

FIG. 9 is a cross sectional view of a locking pin employed in securing the pawl against angular motion.

DESCRIPTION OF THE PREFERRED EMBODIMENT

Referring now to the drawings wherein like reference characters designate like or corresponding parts throughout the several views there is shown in FIG. 1 an improved hitch 10 which embodies the principles of the instant invention.

The hitch 10, as shown in FIG. 1, is supported by a three-point hitch assembly, generally designated 12, mounted at the rear of a tractor, generally designated 14. As shown, the hitch 10 serves to couple a trailer, gondola, or similar vehicle or implement, generally designated 16, with the tractor 14. While the hitch 10 is particularly suited for suspension from a three-point hitch assembly 12, it is to be understood that the hitch 10 can be mounted on and supported by any suitable structure and utilized in coupling towable vehicles and implements with towing vehicles, such as tractors and the like. It is to be particularly noted, however, that by supporting the hitch 10 through a three-point hitch assembly, the utility of the hitch is substantially enhanced, since the hitch 10 can be readily raised and lowered to an appropriate level preparatory to performing a coupling function.

Of course, three-point hitch assemblies are well known therefore a detailed description of the three-point hitch assembly 12 is omitted in the interest of brevity. However, for the sake of providing a complete description of the invention, it is to be understood that the three-point hitch assembly 12 includes a pair of rearwardly extended arms 18 pivotally coupled at their base ends to the transmission case, not designated, of the tractor 14. The arms 18 are raised and lowered through articulated linkages 20, including arms 21 radially extended from a selectively driven rotary shaft 22. At the distal end of each of the arms 18 there is provided a receiver including an eye, designated 24. A parallel link 26 is pivotally coupled at its base with the transmission case of the tractor 14. The link 26 also includes a receiver having an eye, designated 28, provided at its distal end.

The hitch 10 includes a cantilevered receiver 30 supported by a frame 32. The frame 32 includes a transverse bar 34 having a pair of oppositely directed coaxially aligned coupling pins 36 configured to be received within the eyes 24 provided for the arms 18 of the three-point hitch 12. The frame 32 further includes a bifurcated hanger 38 welded to the transverse bar 34 near each of its opposite ends. The hanger 38, in turn, is provided with a suitable clevis 40 configured to receive the eye 28 of the parallel link 26. A suitable clevis pin 42 is extended through the clevis 40 and the eye 28 for thus uniting the parallel link 26 with the hanger 38.

As a practical matter, the frame 32 further includes an inclined strut 44, extended downwardly and rearwardly from the clevis coupling 40 into a welded relationship with the receiver 30, and a laterally projected pair of converging arms 46, welded at their base ends to the transverse bar 34 and at their distal ends to the receiver 30. Thus the receiver is supported against motion imparted thereto relative to the frame.

The receiver 30 includes an upper plate 48 and a lower plate 50. The plates 48 and 50 are of similar configurations and dimensions and are vertically spaced a distance suitable for receiving therebetween a spring-loaded pawl 52 of a generally disk-shaped configuration. The plates 48 and 50 are rigidly united through a plurality of bolts 54 extended therethrough and supporting spacers, not designated.

Each of the plates 48 and 50 includes an appropriately formed relief which collectively establishes a throat 56 for the receiver 30. The throat 56 thus formed is of an outwardly expanding configuration and includes a pair of converging surfaces which, at their juncture, define a pin receptacle 58 of a fluted configuration. The receptacle serves to receive a rigid hitch pin 60, FIG. 8, projected vertically from a tongue or similar structure normally provided for a towable vehicle. It is, of course, to be understood that the converging surfaces defining the relief for each of the plates 48 and 50 cooperate and function as a single surface for guiding the hitch pin 60 into a received relationship with the receptacle 58.

The pawl 52 is of a disk-shaped configuration and is disposed between the plates 48 and 50. As a practical matter the pawl is supported for angular displacement about an eccentrically related axis by a suitable bearing pin 62 which passes through coaxially aligned openings provided in the pawl 52 as well as the plates 48 and 50. A bolt and sleeve assembly serves quite satisfactorily as a bearing pin.

The pawl 52 includes a pair of converging surfaces 64 and 66 which lie, generally, along imaginary chords for the disk-shaped pawl 52 and intersect at a receptacle 68, also of a fluted configuration. The surfaces 64 and 66 thus define a notch whereby a fluke 70 is established at a peripheral zone of the pawl 52. The fluke 70 serves to capture the hitch pin 60 and support it against withdrawal from the receptacle 58 of the receiver 30.

As best shown in FIG. 4, the surface 66 is of a length such that when the pawl 52 is in a first position, or ready position, the surface 66 extends transversely of the throat 56. The surface 64, on the other hand, is of a length such that when the pawl 52 is in a second position, or latching position, the fluke 70 is extended across the throat 56. It should therefore be apparent that when the pawl is in its first position, as illustrated in FIG. 4, the surface 66 serves as an impact surface against which the hitch pin 60 is impacted for imparting angular motion to the pawl 52, about the bearing pin 62, for permitting the pin 60 to be received in the receptacle 58. Angular motion thus imparted to the pawl causes the fluke 70 to be advanced into a transverse relationship with respect to the throat 56 for thus capturing the pin 60 as it seats within the pin receptacles 58 and 68.

In order to maintain the pawl 52 in its second position, a spring-biased locking-pin assembly 72 is provided. The locking pin assembly 72 includes a housing 74 within which is mounted a spring-biased pin 76, affixed to the plate 48. The pin 76, in turn, is supported in coaxial alignment with a pair of coaxially aligned openings 78 and 80 provided in plates 48 and 50. The pawl 52 is provided with an opening 82 so positioned as to align with the openings 78 and 80 when the pawl 52 is in its second position. Once the openings 78, 80 and 82 are aligned, the spring-biased pin 76 is forcibly extended therethrough in response to forces axially applied thereto by a spring 84 seated in the housing 74. Thus, the pin 76 serves to lock the pawl 52 in its second position so that the hitch pin 60 is securely confined within the receptacles 58 and 68.

A release linkage 85 is provided for extracting the pin 76 from the openings 80 and 82. This linkage includes a bellcrank 86 supported for pivotal motion by an upstanding bracket 88. One arm of the bellcrank 86 serves to receive the upper end of the pin 76 while the distal end of the opposite arm of the bellcrank 86 is connected with a driver 90 through a link 92. The driver 90 includes an arm radially extended from a horizontally oriented shaft 94 supported by suitable bearings, not designated. Also extended radially from the shaft 94 is a lever arm 96, FIG. 4, which is connected through a link 98 with a pivotally supported actuating lever 100.

The lever 100 is supported for oscillation about an axis extended through its base by a suitable bearing pin 102. This pin extends through a clevis 104 which, in turn, depends from the lowermost surface plate 50 of the receiver 30. As shown, the lever arm 100 extends upwardly to a position such that it may readily be grasped by an operator situated on the tractor 14. As a practical matter, a tension spring 106 having one end thereof connected with the strut 44 and the opposite end thereof connected with the lever 100, is provided for supporting the lever 100 in an inoperative, upright position.

It should therefore be apparent that as the lever 100 is angularly displaced against the applied forces of the spring 106, and about the bearing pin 102, the shaft 94 is caused to rotate. As the shaft 94 is rotated, the link 92 is placed in tension for angularly displacing the bellcrank 86, whereupon the pin 76 responsively is lifted against the applied forces of the spring 84.

It is here noted that while the control linkage 85 functions quite satisfactorily for this purpose, an electrically energizable solenoid could be employed equally as well for lifting the pin 76 from the opening 82 formed in the pawl 52.

In any event, it is to be understood that once the pin 76 is extracted from the opening 82, formed in the pawl 52, the pawl is free to return to its first position so that the fluke 70 once again is in juxtaposition with the throat 56 and the surface 66 is extended thereacross.

In order to return the pawl 52 to its first position, a tension spring 106 is provided. This spring is connected to the pawl 52 by a radially extended pin 108, while the opposite end of the spring 106 is connected to the plate 48 by a suitable pin 110 located in spaced relation with the pawl. Thus, the pawl 52 is resiliently supported at its first position by the spring 106.

OPERATION

It is believed that in view of the foregoing description, the operation of the device will readily be understood and it will be briefly reviewed at this point.

With the hitch 10 assembled in a manner hereinbefore described, the coupling pins 36 preferably are seated in the eyes 24 of the arms 18 of the three-point hitch 12. The parallel link 26, of course, is similarly connected at the clevis coupling 40 with the hanger 38 of the frame 32. Thus, the hitch 10 is supported by the three-point hitch 12 of the tractor 14. Selected rotary motion imparted to the shaft 22 serves to raise or lower the hitch 10 into a position such that the receiver 30 is caused to be disposed in a coplanar relation with a hitch pin 60 projected vertically from a tongue or similar structure employed in connecting a towable vehicle 16 or similar implement, to the tractor 14.

As hereinbefore mentioned, the spring 106 serves to urge the pawl 52 to its first position so that the impact surface 66 is extended transversely of the throat 56, while the fluke 70 is in juxtaposition therewith. An operator seated on the tractor 14 need only back the tractor toward the hitch pin 60 so that the hitch pin is caused to advance, relatively, along a path extended into the throat 56. As the hitch pin 60 is advanced into impacting engagement with the surface 66 of the pawl 52, the pawl 52 is angularly displaced about the bearing pin 62 so that the hitch pin is caused to be received by the receptacle 58. At the instant the hitch pin 60 is seated in the receptacle 58 the pawl 52 comes to rest with the fluke 70 extended transversely of the throat 56. In this position, the hitch pin 60 is received within the receptacle 68.

Instantaneously with the seating of the pawl 52 in its second position, the opening 82, formed within the pawl, is brought into coaxial alignment with the openings 78 and 80, whereupon the spring 84 serves to drive the pin 76 through the openings. Thus, the towable vehicle 16 is coupled with the tractor 14 through the hitch 10, without requiring a manipulation or lifting of the tongue or similar structure for the trailer. Since the hitch 10 is supported by a three-point hitch, the tongue may be lifted to any suitable elevation simply by raising or lowering the hitch.

In order to release the hitch pin 60 from the hitch 10, an operator grasps the lever 100 for pivoting the lever about the bearing pin 102, whereupn the shaft 94 is rotated for tensioning the connecting link 92. The bellcrank 86 responsively is rotated for lifting the pin 76 against applied forces of the spring 84. This lifting of the pin 76 causes the pin to clear the opening 82, formed in the pawl 52. As the pin 76 thus is extracted from the opening 82, the spring 106 is rendered effective for imparting angular displacement to the pawl for returning the pawl to its first position.

In view of the foregoing, it should readily be apparent that the hitch 10 of the instant invention provides a practical solution to the perplexing problem of coupling towing vehicles such as tractors and the like with towable vehicles such as trailers, gondolas and similar vehicles and implements without necessitating a manual lifting of tongues and similar devices.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An improved hitch for coupling a towable vehicle with a towing vehicle comprising:
   A. a hitch-pin receiver including a pair of horizontally oriented plates disposed in mutually spaced parallelism, each of said plates being provided with a pair of converging surfaces defining a horizontally extended throat for receiving a hitch pin;
   B. a latching pawl comprising a substantially disk-shaped plate interposed between said horizontally oriented plates including a pair of surfaces defining therefor a peripheral fluke, means supporting said latching pawl for oscillatory motion including a bearing pin extended through said pair of horizontally oriented plates in abaxial alignment with said throat, tension means connected with said pawl for continuously urging said pawl in displacement toward a first position wherein the fluke is in juxtaposition with said throat and one surface of said pair of surfaces defining said fluke is disposed substantially transversely of said throat in a position to be engaged by a hitch pin as the hitch pin is inserted into said throat for displacing said pawl to a second position wherein the fluke is disposed transversely of said throat for capturing said hitch pin;
   C. a pawl retainer for securing said pawl against angular displacement, including a spring-biased locking pin supported for extension through at least one of said horizontally oriented plates and said pawl;
   D. release means for extracting said lockiing pin from said pawl comprising a bellcrank having one arm therof connected with said spring-biased locking pin and the opposite arm thereof connected with a manually operable linkage; and
   E. means for connecting said hitch with a three-point hitch assembly of a tractor.

* * * * *